Feb. 19, 1952 T. O'C. McCARTHY 2,585,956

MOTION TRANSMISSION SYSTEM

Original Filed May 13, 1944 2 SHEETS—SHEET 1

INVENTOR.
THOMAS O. McCARTHY

BY [signature]

ATTORNEY

INVENTOR.
THOMAS O. McCARTHY
BY [signature]
ATTORNEY

Patented Feb. 19, 1952

2,585,956

UNITED STATES PATENT OFFICE 2,585,956

MOTION TRANSMISSION SYSTEM

Thomas O'Connell McCarthy, Pawling, N. Y.

Original application May 13, 1944, Serial No. 535,529. Divided and this application January 6, 1949, Serial No. 69,546

4 Claims. (Cl. 33—224)

(Granted under the act of March 3, 1883, as amended April 30, 1928; 370 O. G. 757)

This invention relates to electrical systems for transmitting angular motion that include a transmitter unit and one or more repeater units. This application is a division of my copending application entitled "Compass Correction System," Serial No. 535,529, filed May 13, 1944, abandoned. The subject matter of the abandoned application is described and claimed in my copending application "Compass Correction System," Serial No. 104,122, filed July 11, 1949, now Patent No. 2,581,428 granted January 8, 1952, as a continuation of said abandoned application.

A well-known type of such a system includes transmitter and repeater units which are usually alike and each comprises a single-circuit field winding and a polycircuit armature winding, one of which constitutes a stationary element known as the stator and the other a movable element known as the rotor. The field windings of the transmitter and repeater are excited from a suitable source of alternating current and the respective armature windings are connected together.

These systems are used for many purposes and, under normal conditions, the repeater unit will follow the transmitter unit faithfully. In other words, motion of the transmitter through a 30° angle will cause the repeater to move through a 30° angle in the same direction, and so on.

In certain applications of angular-motion-transmission systems, it is desired not to have the repeater follow the transmitter degree for degree. For example, in a remote-reading compass system it is desirable to introduce a correction for the well-known compass errors. Likewise in direction-transmitting systems such as used in ordnance for target designation, the transmitted direction must be modified to allow for horizontal and for vertical parallax before the gun, range finder, or searchlight will point at the target being designated by the locator instrument. Similarly, in radio-direction finders there exists an error that resembles a deviation error found in the compass art and that is, in fact, called a deviation error. This error can be corrected, compensated for, or removed so as to provide a direction indication that is approximately true. Many other installations incorporating direction-transmission systems are known wherein it is likewise desirable to provide a controllable asynchronous relation between the transmitter and repeater units.

A general object of this invention, therefore, is to provide a new and improved apparatus for effecting a controllable asynchronous relation between the transmitter and the one or more repeater units of an angular-motion-transmitting system.

Another object is to provide an apparatus of the type described wherein the amount of the asynchronism between the transmitter and repeater units varies as a function of the instant angular position of the transmitter unit.

A further object is to provide a new and improved electrical device for connection between the transmitter and repeater units of a synchro system wherein the normal synchronous relation existing between the rotor elements of these units is made asynchronous by an amount that varies as a desired function of the instant angular position of the rotor element of the transmitter unit relative to its stator element.

Another object of this invention is to provide an improved and automatic electrical compensator for angular-motion-transmission systems that is much less costly than the present known mechanical compensators and that is also exceedingly simple in construction and operation. Furthermore, through simple adjustment means, the character of the compensation effected by the device can be altered over a very wide range to provide almost any action required.

Another object is to provide a new and improved apparatus that automatically compensates for the deviation error in remote-reading compass systems.

A further object of the invention is to provide a new and improved apparatus that automatically compensates for the deviation error in an earth-inductor-compass system.

A still further object of the invention is to provide a novel type of construction for a control transformer.

Another object is to provide a novel means of combining electrical and mechanical quantities.

These and other objects of the invention will become more apparent from the detailed description to follow and the accompanying drawings which show preferred embodiments of the invention in which:

Fig. 1 is a diagrammatic view of the invention as applied to a flux-gate earth-inductor-compass system;

Fig. 1*a* is a perspective view of a control transformer according to the present invention with the windings omitted in the interest of clarity;

Figures 1, 1A, 2, 3:
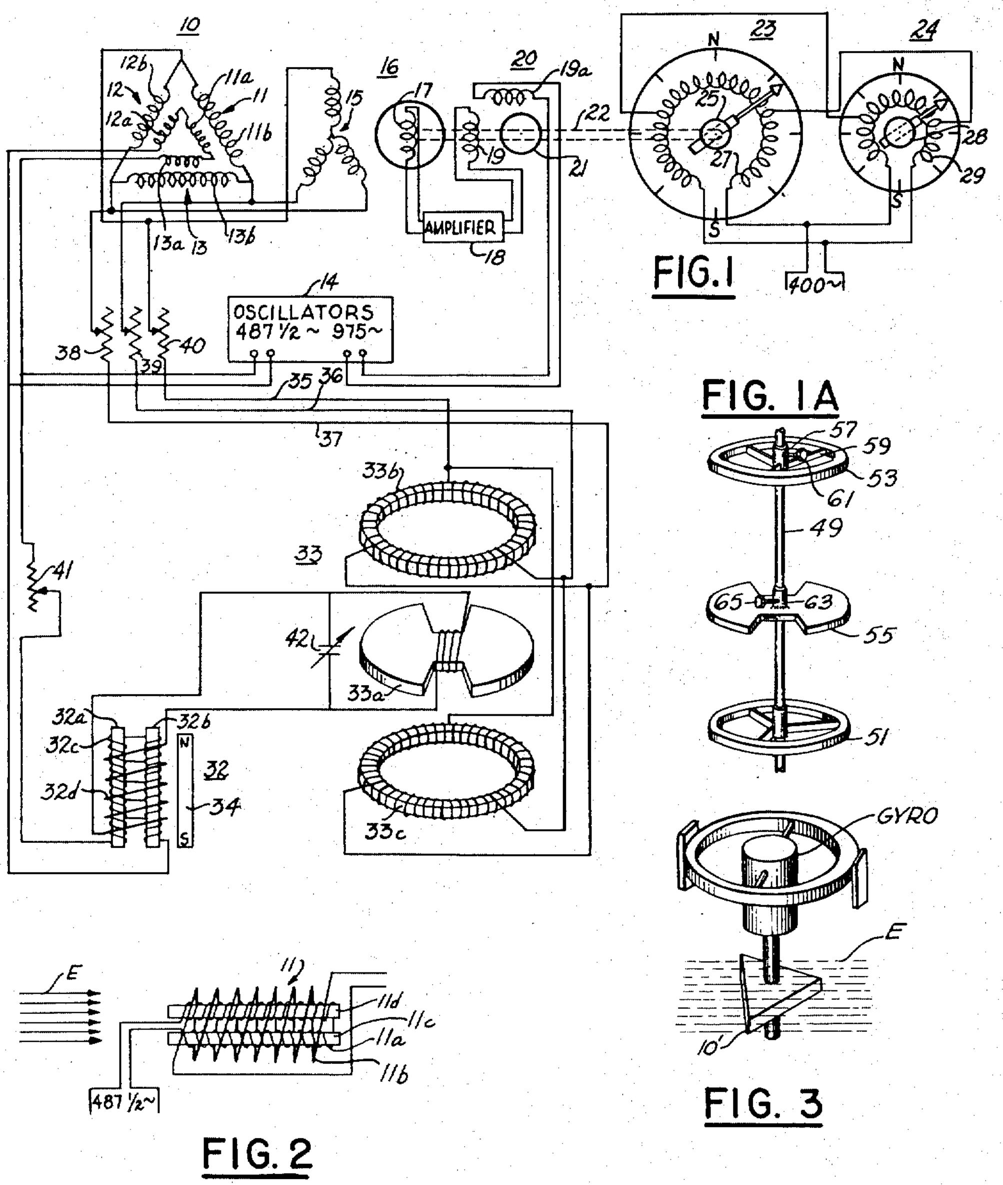
Fig. 2 is a view of the primary and secondary coil arrangement in one leg of the flux-gate.
Fig. 3 is a perspective view of the gyro-stabilized flux-gate.
Figure 4:
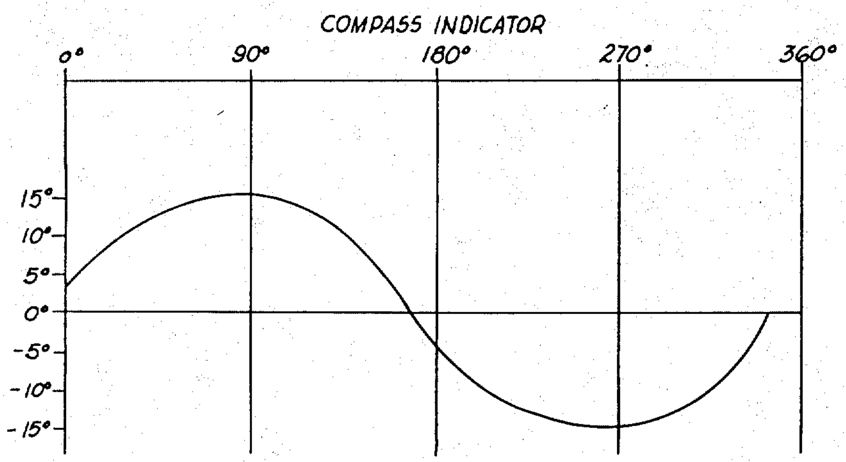
Figure 5:
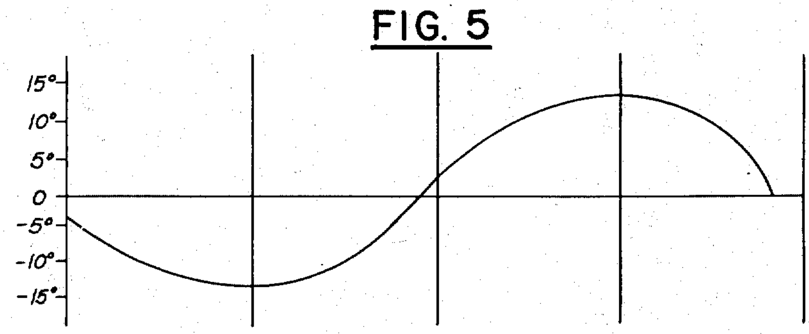
Figure 6:
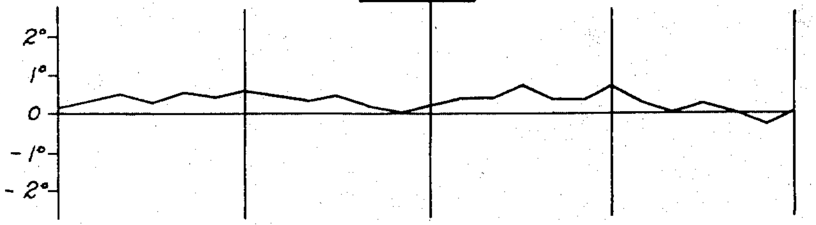

Figs. 4, 5, and 6 are plots of the deviation, correction and resultant curves for the apparatus in Fig. 1.

In Figs. 1–3, inclusive, there is shown diagrammatically an earth-inductor-compass system constructed according to the present invention. A saturable core transformer, or flux-gate, indicated by numeral 10, consists of three legs, 11, 12 and 13, arranged to form an electrical equilateral triangle in space. All of these legs are of the same construction and each of them (see Fig. 2) such as leg 11 consists of a primary winding 11*a*, secondary winding 11*b*, and a pair of closely adjacent cores 11*c* and 11*d*.

As shown in Fig. 2, the primary winding 11*a* is divided, one half being wound on core 11*c* and the other half on core 11*d*. The two halves of the primary are wound in opposite directions and they are thus non-inductive. The primary winding 11*a* is excited from a source of alternating current which, in the present embodiment, has a frequency of 487½ cycles per second obtained from a suitable oscillator 14 (Fig. 1) of conventional design and therefore shown only in block diagram.

The primary windings 11*a*, 12*a* and 13*a* are designed to saturate their respective cores twice during each cycle, and for most of the cycle. During the saturation period there is, of course, no transformer action between the primaries and their associated secondaries. During each of the two unsaturated periods of the cycle, there is still no transformer action between the primary and secondary windings insofar as concerns the component of current in the primary from the 487½ cycle per second source because the two halves of each primary winding are wound in opposite directions. However, during each of the unsaturated periods, the earth's flux E cuts through both halves of the core in the same direction and therefore induces a voltage in each secondary winding, the induced voltage having a frequency twice that of the primary, or 975 cycles per second.

As shown in Fig. 3, the three legs of flux-gate may be enclosed in a casing 10′, which is mounted in gimbals and stabilized by a gyro in order to maintain it horizontal in the earth's field E. A suitable arrangement is shown in the U. S. Patent to A. A. Stuart, Jr., No. 2,361,433, patented October 31, 1944, to which reference is made for a fuller disclosure thereof.

The amplitude of each of the three voltages induced in the secondaries 11*b*, 12*b* and 13*b* depends on their instant position relative to the direction of the earth's field. These voltages therefore vary with the instant heading of the aircraft, vessel or other carrier upon which the flux-gate is mounted. As the compass is rotated in the earth's flux, the three voltages vary in a manner similar to the voltage variations caused by movement of the rotor in a conventional synchro system.

It should be pointed out that the magnitude of the induced voltages in these secondaries, which, as shown, may be delta connected, is very small, being of the order of a few microvolts. Hence, it is necessary to connect the output thereof to a Y-connected stator 15 of a coupling Autosyn 16. The rotor element 17 of the Autosyn is provided with a single-circuit winding and the voltage induced therein by the currents in its polycircuit stator windings is amplified in amplifier 18, of conventional construction, and transmitted to the variable-phase winding 19 of a two-phase stator element of a low-inertia induction motor 20. The other phase winding 19*a* of the stator is connected to the 975 cycle per second alternating-current output terminals on oscillator 14. Induction motor 20 has a squirrel-cage rotor 21.

Rotors 17 and 21 are mechanically coupled together by a shaft 22. Hence the voltages impressed upon the stator windings 19 and 19*a* of motor 20 will cause its rotor 21 and rotor 17 to rotate until the latter reaches its null position. Induction motor 20 is therefore a torque amplifier which turns rotor 17 to the position it would take were it able itself to develop the necessary torque.

From what has been described so far, it is seen that a change in angular position of the flux-gate 10 relative to the earth's field effects a like angular change in the position of rotors 17 and 21 and the shaft 22 connected therebetween. The flux-gate 10 is therefore analagous to the transmitter unit of a synchro or self-synchronous system and the motors 16 and 20 analagous to a repeater unit of such system.

For repeating the instant angular position of rotors 17 and 21, a second self-synchronous system is utilized and comprises a transmitter unit 23 and one or more repeater units 24.

The transmitter and repeater units are similar in structure, although the repeater would normally be smaller than the transmitter if the latter is to drive a number of repeater units.

The transmitter unit 23 includes a permanent-magnet rotor 25 coupled to shaft 22 and a stator including a circular, laminated core. The stator has an exciting coil 27 wound upon it with a lead tapped off at each 120° point, thus making four leads altogether: two input leads and two tapped leads. The constants of the transmitting unit (the number of turns, value of exciting current, and magnetic alloy selected for the stator core) are chosen so that the stator core will be completely saturated twice during, and for most of, each cycle of its supply source, which has a frequency of 400 cycles per second. During periods of saturation, no inductive effect can be produced within the core by the exciting current or the permanent-magnet rotor. However, during each of the short unsaturated periods of the core, the rotor is free to produce an inductive effective upon it. During these periods, the rotor's magnetic flux flows through the core, and as it does so, induced voltages are superimposed in the stator winding. These voltages are at a frequency of 800 cycles per second since the stator core is rendered unsaturated for a short period twice during each cycle. The voltages across the taps of each of the three parts of the stator winding differ in value and vary with the instant position of the rotor 25 relative to stator winding 27.

As previously stated, the repeater unit 24 is similar to transmitter unit 23 and its rotor and stator winding are identified by reference numerals 28 and 29, respectively.

The stator windings 27 and 29 of the transmitter and repeater units 23, 24 are connected in parallel and excited from the same 400 cycle per second alternating-current source.

When the rotors 27, 29 of units 23, 24 are in the same position relative to their respective stator windings, the three tapped voltages induced in the stator windings 27 and 29 are alike. However, when the rotor 25 is rotated by shaft 22, the induced voltages in the stator winding 27 will differ from those in the stator winding 29 causing signal current to flow from winding 27 to winding 29 superimposed upon the excitation current. This flow of current produces a new resultant magnetic flux in the stator winding 29 causing the rotor 28 of the repeater unit to rotate until it is in the same relative position to its stator winding 29 as the rotor 25 in the transmitter unit is to its stator winding 27. Accordingly, any angular displacement of rotor 25 by rotation of shaft 22 causes a like displacement of rotor 28.

It is now seen that as the bearing of the carrier for the flux-gate 10 changes relative to the earth's field, such bearing change will be fed electrically through the Autosyn coupling 16 and induction motor 20 producing an equal angular change in the position of shaft 22 and of the rotor 25 in the transmitter unit 23, which angular change may be indicated by a pointer 30. Transmitter unit 23 is then, in effect, a master compass. The position of pointer 30 may then be repeated by a pointer 31 on the rotor element of the one or more repeater units 24.

The earth-inductor-compass and all other types of compass systems depending upon the earth's magnetic flux for direct indications fail to indicate the true geographic north by the algebraic sum of the variation and deviation errors. Variation, which is the angle between the true or geographical and the magnetic meridians, is known for any given locality. The deviation is the total angular difference between the magnetic meridian and the indications of the compass system, and is caused by the magnetism of the vessel or other carrier upon which the compass system is carried.

The remote-reading earth-inductor-compass system that has been described thus far is exceedingly practical since the magnetically sensitive element (flux-gate 10) can be mounted so as to eliminate the effects of the unsymmetrical iron and steel of the compass carrier, such as are found in a vessel, and in a location where the effects of horizontal soft iron will be of a low value. When this condition is obtained, the deviation error is reduced to a factor, that, when plotted as an ordinate against compass indication as an abcissa, results in a curve having sinusoidal characteristics. A typical curve is shown in Fig. 4.

In the earth-inductor compass that has been described, the bearing indication on the transmitter unit 23 would, if not compensated, be in error by the algebraic sum of the variation and deviation errors. In this invention no compensation for variation is contemplated because this component of the total error is a constant for any latitude in which the compass carrier may be. However, one way for compensating the variation error would be to provide some means for shifting the rotor 25 of the transmitter 23 relative to shaft 22.

However, this invention does provide an automatically operating and novel corrector or compensator which will substantially cancel out the deviation component of the total error.

Automatically operated deviation compensators presently known are of a mechanical nature and most costly, and in no case do they alter the compensation to match the change in deviation error caused by displacement in magnetic latitude of the carrier. This invention substitutes an electrically-operated compensator that is far more simple and less costly.

In particular, and with reference to Fig. 1, one form of my improved deviation compensator comprises a wave generator 32 and a control transformer device 33. The wave generator 32 consists of a flux-gate element which is similar to any of the three legs of flux-gate 10. That is, the generator 32 includes two cores 32*a* and 32*b* of a material having a high permeability with a primary winding 32*c* split between them, the two halves of this winding being wound on their respective cores in opposite directions so as to be non-inductive with respect to the secondary winding 32*d* which surrounds primary winding 32*c*.

Primary winding 32*c* is fed from the same 487½ cycle per second output terminals of oscillator 14 as the primary of flux-gate 10. However, wave generator 32 is designed to operate in the magnetic field of a permanent magnet 34, which is placed so as to provide a flux field of the proper intensity and direction. The earth's field is obviously also present in the cores 32*a* and 32*b* but its intensity, when compared to that of magnet 34, is so minute that it can be totally disregarded so far as operation of generator 32 is concerned.

Like flux-gate 10, the two cores 32*a* and 32*b* are saturated twice during, and for almost the entire period of, each cycle. However, during the two short periods in each cycle when cores 32*a*, 32*b* are unsaturated, the entry of the magnetic field from magnet 34 into these cores effects a transformer action to induce a voltage into the secondary 32*d*. The frequency of the voltage output from the secondary 32*d* is twice that of the primary, or 975 cycles per second since the cores 32*a*, 32*b* are saturated twice during each cycle.

Transformer 33 includes a rotatable primary winding 33*a* and a pair of secondary windings 33*b*, 33*c* which may be wound on suitable circular cores and tapped at the 120° points. The outputs from secondary windings 33*b* and 33*c* are connected in parallel and applied by means of conductors 35, 36, and 37 to the stator winding 15 of coupling Autosyn 16. The primary winding 33*a* is fed the output of the secondary winding 32*d* of the wave generator 32. Consequently, when current flows in primary 33*a*, a voltage is induced in each of the three divisions of secondaries 32*b* and 33*c* between the 120° tap points, the amplitude of each such voltage being dependent in part upon the particular angular position at which the rotatable primary winding 33*a* is set relative the secondary windings 32*b* and 32*c*.

For increased flexibility of adjustment, one of the secondary windings, that at 33*b*, is supported for rotation in either direction and also for vertical adjustability. The other secondary winding 33*c* is fixed in a given position. Thus, the amplitude of the voltages induced at the 120° tap points are adjustable according to the instant adjustment of the rotor 33*a*, in view of preliminary adjustments that may be made in winding 33*b*. Any convenient and suitable arrangement can be used for mounting the transformer windings 33*a*, 33*b* and 33*c* to provide the desired adjustability. One such arrangement is shown in Fig. 1*a* and consists of an axial support 49 on which are mounted toroidal cores 51, 53 and core 55 which is of substantially figure-8-shaped construction.

Core 51 is preferably fixed to the axial support 49; cores 53 and 55 are mounted for rotation thereabout and translation therealong. For this purpose, the core 53 is provided with a hub 57 from which extend radial spokes 59 to support the core 53. Hub 57 is manually slidable over and rotatable on the axial support 49, and may be secured at any desired position by means of setscrew 61.

Core 55 is provided with an upstanding collar 63 affixed thereto, which is manually slidable and rotatable on support 49. The core 55 can be secured at any desired position by tightening a setscrew 65. Coils 33*a*, 33*b* and 33*c* wound on cores 55, 53 and 51, respectively, are not shown in Fig. 1*a* to avoid complication of the drawing.

The means disclosed for providing the desired adjustability of the coils 33*a* and 33*b* are merely exemplary and any other suitable means can be employed. If necessary or desired, conventional sliding electrical contacts can be used between the lead wires and the windings to avoid twisting and mutilation thereof.

The three voltages at the 120° tap points, which are the correction voltages to compensate for the deviation error, are, as noted above, connected into the electrical connections between the secondary windings 11*b*, 12*b*, 13*b* and stator windings 15 of the coupling Autosyn 16 by means of conductors 35, 36 and 37 and series-connected variable resistors 38, 39 and 40.

During the operation of the flux-gate system, a very complex flow of current exists between the secondaries of the flux-gate element 10 and the stator elements 15 of the coupling Autosyn 16. This current changes for every angular position of the flux-gate with respect to the earth's field. A part, at least, of the current flowing between the flux-gate element and stator element 15 is thought to circulate through the secondaries of the transformer 33, reacting, in turn, upon the primary of this transformer and causing the current flowing therein to vary in strength as the flux-gate element rotates in the earth's field. The output electromotive force of the transformer unit, accordingly, varies as a function of the angular displacement of the compass or earth inductor.

In the system shown in Fig. 1, the primary winding 32*c* of generator 32 is excited at one-half the frequency of the voltage outputs from secondary windings 11*b*, 12*b* and 13*b* of the flux-gate 10. As this frequency is doubled by wave generator 32, the correction voltages from transformer 33 will be at the same frequency as the output voltages from secondaries 11*b*, 12*b* and 13*b*. As the excitation for both flux-gate 10 and generator 32 is derived from the same source, oscillator 14, and transformer 33 is electrically coupled to generator 32, a predeterminable but controllable phase relationship exists between the deviation correction voltages and the output voltages from flux-gate 10.

It should now be apparent that if good compensation for the deviation component of the total compass error is to be obtained, correction voltages must be derived that, if applied to an earth-inductor-compass system without a compensator and located on a vessel or other carrier having no iron whatsover, would produce a curve such as that shown in Fig. 5. Theoretically, this curve should be such that were it to be combined algebraically with the curve in Fig. 4, the net result would be zero error around the entire horizon. Although the theoretically desired curve is possible, it has been found in practice that a correction curve that only approximates the contour of the deviation curve and will therefore produce the resultant curve such as that shown in Fig. 6 is satisfactory. Such a curve can be obtained by varying the position of the primary 33*a* relative to the secondaries 33*b* and 33*c* associated therewith and making such adjustments as may be necessary in the settings of resistors 38, 39 and 40 in circuit with the secondary winding of transformer 33, and resistor 41 in circuit with the primary of generator 32. The points at which the correction curve crosses the base line can be adjusted by shifting the position of primary winding 33*a* and the amplitude of the curve is adjusted through resistors 38—41, inclusive. For compounding two curves of varying amplitude and frequency, adjustment of winding 33*b* can be made. For further controlling of the amplitude of the correction voltages or the shape of the correction curve, a phase shifting device in the form of a variable capacitor 42 in the primary circuit of the correction transformer 33 may be used.

As the heading of the carrier on which the compass system is installed changes through 360°, the only error will be that shown in Fig. 6 which is within the inherent error of the compass system.

Once the correct position for the primary 33*a* of transformer 33 relative to its secondaries 32*b* and 33*c* is adjusted for any particular compass installation, it need not be disturbed because it will automatically produce the right amounts of correction voltages required at any instant bearing throughout the 360° range.

As an alternative arrangement, the component parts of the distributed secondary windings 33*b* and 33*c* of transformer 33 may be Y-connected instead of connected in delta as shown in Fig. 1.

In an actual correction problem the curve of compass deviation such as shown in Fig. 4 may be obtained by any of the standard well-known methods for the particular ship in which the compass system is to be installed. With these data available it is simple matter to make the necessary adjustments to the corrector circuits to remove the deviation from the system. The compass heading of the ship having been determined, from the curve, for (*a*) each null point and (*b*) the points of maximum amplitude, the ship is swung so as to be on the heading of a null, and the rotatable primary 33*a* of the correcting transformer 33 is positioned so that there is no deviation in the compass system for this particular heading. The ship is then swung to the heading of a point of maximum deviation and the primary excitation of the corrector transformer is adjusted to remove all deviation; it will then be found that the deviation will have been removed or reduced to a small value for all headings of the ship. Should finer adjustment be desired a second swing of the ship can be made and the controls readjusted. Should the curve of compass variations be non-symmetrical, it may be necessary to adjust the resistances in the secondary leads from the corrector transformer, and/or impedance in the primary excitation circuit.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. An earth-inductor-compass system comprising, a flux-gate having a plurality of interconnected flux-gate legs, each leg having primary and secondary windings thereon, electrical indicator means connected to the output of the flux-gate secondary windings for indicating azimuthal position of said flux-gate, a control transformer comprising a primary winding and a pair of relatively adjustable secondary windings having a common output, an oscillator having a pair of outputs, one of said outputs being at a frequency double that of the other output, means connecting the lower frequency output to the primary windings of said flux-gate, means connecting the higher frequency output to the primary winding of said control transformer, and means connecting the output of said secondary windings of said control transformer to the output of the flux-gate secondary windings.

2. An earth-inductor-compass system comprising, earth-induction means including a plurality of saturable core type transformers for producing from the horizontal component of the terrestrial magnetic field electromotive forces varying in accordance with the amount and direction that said induction means are displaced in azimuth relative to the direction of the terrestrial magnetic field, a source of alternating current for exciting the primaries of said transformers, means interconnecting the secondaries of said transformers to provide a polycircuit electromotive force output, electrical indicator means including a polycircuit winding for indicating angular displacement of said induction means, electrical connections between the secondaries of said transformers and the polycircuit winding of said indicator means, and means for modifying the polycircuit output produced by said induction means as a function of the angular displacement of said induction means to compensate for deviation, last said means comprising a control transformer having a single single circuit primary and at least two relatively adjustable polycircuit secondaries having a common output, means connecting the polycircuit output from the secondaries of said control transformer to the connections between said induction and indicator means, and means for exciting the primary of said control transformer with an alternating current at a frequency double that of the current feeding the primary of said earth induction means.

3. An earth-inductor-compass system comprising, a flux-gate having a plurality of interconnected flux-gate legs, each leg having primary and secondary windings thereon, electrical indicator means connected to the output of the flux-gate secondary windings for indicating azimuthal position of said flux-gate, a control transformer having a primary winding and a pair of secondary windings mounted for translational and rotational adjustment with respect to each other and the primary winding of said control transformer, said secondary windings having a common output terminal, a wave generator comprising a single flux-gate leg having a primary and secondary winding and disposed in a relatively strong unidirectional magnetic field, means connecting the output from the secondary winding of said wave generator to the primary winding of said control transformer, means for supplying alternating current to the primary windings of said flux-gate and wave generator from a common source, and means connecting the output of the secondary windings of said control transformer to the output of the secondary windings of said flux-gate.

4. An earth-inductor-compass system comprising a polycircuit earth induction means having primary and secondary windings for deriving from the horizontal component of the terrestrial magnetic field electromotive forces varying in accordance with the amount and direction that said induction means are displaced in azimuth relative to the direction of the earth's magnetic field, polycircuit electrical indicator means for indicating the angular displacement of said induction means, electrical connections between said induction and indicator means, and means for modifying said electromotive forces, last said means comprising a transformer having a single circuit primary and a pair of relatively adjustable ploycircuit secondaries, means connecting the output from said polycircuit secondaries of said transformer to said electrical connections, means providing a relatively strong unidirectional magnetic field, wave generating means responsive to said relatively strong unidirectional magnetic field for producing an electromotive force alternating in synchronism with the varying electromotive forces derived from the secondary of said induction means, and means coupling said alternating electromotive force to said transformer primary.

THOMAS O'CONNELL McCARTHY.

REFERENCES CITED

The following references are of record in the file of this patent:

UNITED STATES PATENTS

| Number | Name | Date |
|---|---|---|
| 1,525,563 | Baker | Feb. 10, 1925 |
| 1,527,488 | Onwood | Feb. 24, 1925 |
| 1,584,670 | Slepian | May 11, 1926 |
| 1,613,222 | Curtis | Jan. 4, 1927 |
| 1,964,265 | Markley | June 26, 1934 |
| 2,045,831 | Carbonara | June 30, 1936 |
| 2,405,050 | Pfunter et al. | July 30, 1946 |
| 2,452,862 | Neff | Nov. 2, 1948 |
| 2,472,546 | Pomeroy | June 7, 1949 |

FOREIGN PATENTS

| Number | Country | Date |
|---|---|---|
| 368,280 | Great Britain | Feb. 22, 1932 |